United States Patent
Paul et al.

(10) Patent No.: US 7,356,044 B1
(45) Date of Patent: Apr. 8, 2008

(54) METHOD AND APPARATUS FOR THE DELETION OF BYTES WHEN PERFORMING BYTE RATE ADAPTATION

(75) Inventors: Somnath Paul, Milpitas, CA (US); Gopal K. Garg, Fremont, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 973 days.

(21) Appl. No.: 10/327,224

(22) Filed: Dec. 20, 2002

(51) Int. Cl.
*H04J 3/16* (2006.01)
(52) U.S. Cl. ............................ 370/465; 370/466
(58) Field of Classification Search ............ None
See application file for complete search history.

(56) References Cited

U.S. PATENT DOCUMENTS 6,993,046 B1 * 1/2006 Hernandez-Valencia et al. . 370/470
2003/0095054 A1 * 5/2003 Ichino .................... 341/58
2003/0112833 A1 * 6/2003 Kamiya .................. 370/535
2005/0063396 A1 * 3/2005 Yu ...................... 370/401

* cited by examiner

Primary Examiner—Duc Ho (57) ABSTRACT

A method and apparatus for performing byte rate adaptation. Specifically, embodiments of the present invention describe a method for deleting bytes when performing byte rate adaptation. The method begins by receiving data at a first rate. The data comprises valid data and deletable data. The data also comprises a plurality of cycles, wherein each cycle comprises a word length of W bytes. The method continues by compressing the plurality of cycles into a compressed cycle by deleting redundant deletable bytes. The compressed cycle comprises at least one valid data byte. Thereafter, the method substitutes remaining deletable bytes in the first compressed cycle with a uniform character, and sends the compressed cycle to a FIFO buffer for further transmission.

27 Claims, 8 Drawing Sheets

| CYCLE 2 720 | CYCLE 1 710 | AFTER REMOVAL 730 |
|---|---|---|
| B12 _721_ | B11 _711_ | B11 _731_ |
| B22 _722_ | B21 _712_ | B21 _732_ |
| B32 _723_ | B31 _713_ | B32 _733_ |
| B42 _724_ | B41 _714_ | B42 _734_ |
| B52 _725_ | B51 _715_ | B52 _735_ |
| B62 _726_ | B61 _716_ | B62 _736_ |

METHOD AND APPARATUS FOR THE DELETION OF BYTES WHEN PERFORMING BYTE RATE ADAPTATION

BACKGROUND OF THE INVENTION

1. Field of the Invention

Embodiments of the present invention relate to the field of rate adaptation. More particularly, embodiments of the present invention relate generally to the deletion of bytes when performing byte rate adaptation.

2. Related Art

Data traffic over a communication network between a client device and a transmitting device can use a Layer 1 block code to transmit control information and data. A common block code used at the client device is the 8B/10B line code used, for example, in the Gigabit Ethernet, Enterprise Systems Connection (ESCON), SBCON, Fiber Channel, Fibre Connect (FICON), and Infiniband protocol standards. The 8B/10B line code ensures adequate bandwidth with increased quality of service performance by operating in a 10-bit code space. The 10-bit characters used by the 8B/10B encoding offer four times the characters of an 8-bit character space. Data transmitted from the transmitting device to the client device contains 8B/10B line code control information suitable for interfacing with the client device.

The data transmitted from the transmitting device can be sent at a first rate. For example, the first rate can be a data rate and/or clock rate. However, on the client side, the data is read at a second rate, e.g., a second data rate and/or a second clock rate. As such, rate adaptation is performed on the data coming from the transmitting device in order to adapt the data to the second rate that is compatible with the client device.

In particular, to keep the link connected, the data traffic following the 8B/10B line code can contain padding characters. The 8B/10B coded data itself can contain special control character sequences (e.g., primitive sequences, idle sequences, ordered sets, etc.). These characters can be inserted or deleted as specified by the particular protocol compliant with the 8B/10B line code to adapt the incoming data to the rate preferred by the client device. This rate adaptation can occur both at the transmitting device and the client device.

Figure 1:
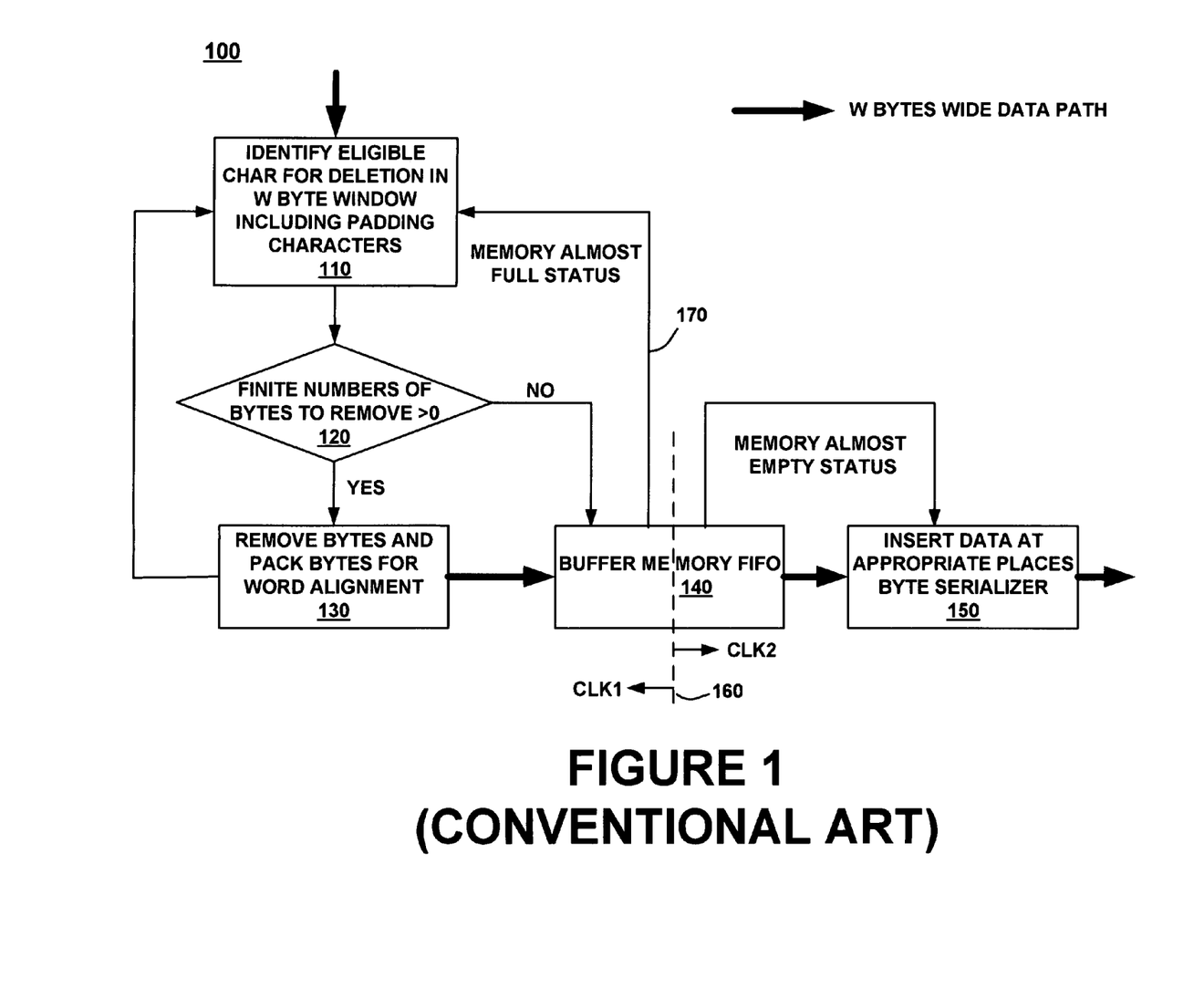
FIG. 1 is a block diagram of a conventional method for performing rate adaptation.

FIG. 1 is a block diagram 100 illustrating a flow chart of steps for performing rate adaptation in accordance with a convention implementation. In the conventional method, the characters are deleted by first identifying them, and then deleting them as necessary at the client device. Bytes are then realigned before they are written into an egress first-in first-out (FIFO) buffer.

The steps in the method illustrated in conventional art FIG. 1 begins by receiving data at the client device, in order to perform rate adaptation. The data is received in a data path of W Byte width. Also, the data is received at a first rate, e.g., a first clock rate and/or a first data rate. In block 110, eligible byte characters are identified for deletion within each W byte window. These eligible characters include the padding characters and special control character sequences as permitted by the 8B/10B line code.

In block 120, the conventional method determines if there are a finite number of bytes that can be removed. If there are no deletable bytes, then the conventional method proceeds to block 140 by sending the W byte window with no deletable bytes to the FIFO buffer. If there are bytes that can be removed, then the conventional method first removes the eligible bytes in order to conform the data with the second rate preferred by the client device (e.g., a second clock rate and/or a second data rate). Next, the conventional method packs the data and aligns it to make it W bytes wide, which is equal to the datapath width, before sending this out to the next block (140).

From block 130, the conventional art sends the packed bytes to a FIFO buffer, as described in block 140. A gating mechanism is employed in which data into the FIFO buffer is only accepted by the FIFO buffer when there is sufficient amounts of memory in the FIFO buffer, as is illustrated in line 170. If there is an insufficient amount of memory in the FIFO buffer, then the conventional method returns the data to block 110.

Also, from block 130, the conventional method continually checks to identify eligible characters for deletion in incoming W byte windows by returning to block 110 in a parallel manner.

The data entering the FIFO buffer is clocked at the first rate (e.g., first clock rate and/or first data rate). The data exiting the FIFO buffer is clocked at the second rate (e.g., the second clock rate and/or second data rate), that is preferred by the client device.

The conventional method then sends the data to a serializer to insert the data at the appropriate places in order to conform the outputted data stream to a particular format (e.g., an 8 bit byte serial interface), as is illustrated in block 150.

In the conventional method for rate adaptation, significant gate counts are necessary for implementing the rate adaptation for a plurality of channels servicing a plurality of clients. In particular, barrel shifters are required by each channel servicing a particular client to move incoming data through the rate adaptation process as implemented in the conventional method. These barrel shifters take up significant amounts of gate counts, especially as the byte width of the data path becomes larger.

SUMMARY OF THE INVENTION

Thus, a specific drawback to conventional rate adaptation methods is the high gate count necessary for implementing a plurality of barrel shifters for the plurality of channels requiring rate adaptation on the client side. Previously, this high gate count adds to the cost of chip fabrication for integrated circuits including rate adaptation functionality.

Accordingly, various embodiments of the present invention disclose a method and apparatus for performing byte rate adaptation. Specifically, embodiments of the present invention describe a method for the deletion of bytes when performing byte rate adaptation. The embodiments of the method begins by receiving data at a first rate. The data comprises valid data and deletable data. The data conforms with an 8B/10B line code specification. The data also comprises a plurality of cycles, wherein each cycle comprises a word length of W bytes.

The method continues by compressing two or more cycles into a compressed cycle by deleting redundant deletable bytes. The compressed cycle comprises at least one valid data byte. More specifically, the compression is accomplished by deleting one redundant deletable byte for each pair of redundant deletable bytes in a pair of cycles. By repeating this step, one or more redundant deletable bytes in a plurality of pairs of cycles are deleted to obtain the compressed cycle. Each of the plurality of pairs of cycles comprise at least W deletable bytes that are consecutively ordered contained therein.

Thereafter, embodiments of the method substitute remaining deletable bytes in the first compressed cycle with a uniform character. For example, the uniform character can be a 65B_PAD Transparent Generic Framing Procedure (TGFP) character that is recognizable.

Then, embodiments of the method send the compressed cycle to a FIFO buffer for further transmission. During the compression step, bytes in the cycles being compressed are not sent to the FIFO buffer upon processing. Only the compressed cycle is sent to the FIFO buffer. In this way, write steps to the FIFO are inhibited for each byte encountered undergoing compression.

Embodiments of the method delete all of the remaining deletable bytes that are converted to the uniform character to conform with a second rate. Thereafter, a data stream is outputted at the second rate. The data stream includes at least one valid data byte.

Other embodiments disclose a rate adapter for performing byte rate adaptation. The rate adapter comprises a receiving module, an identifying module coupled to the rate adapter, a deletion module coupled to the identifying module, a substituting module coupled to the deletion module, and a buffer memory coupled to the substituting module.

The receiving module receives data at a first rate. The data comprises valid data and deletable data. Also, the data comprises a plurality of cycles, wherein each cycle comprises a word length of W bytes. The identifying module locates a pair of cycles in the data. The pair of cycles comprises at least W deletable bytes that are consecutively ordered contained therein. The deletion module compresses the pair of cycles, or a set of two or more cycles, into a compressed cycle, wherein the compressed cycle comprises at least one valid data byte. The substituting module converts remaining deletable bytes in the compressed cycle to a uniform character. A buffer memory receives the compressed cycle for further transmission at a second rate.

BRIEF DESCRIPTION OF THE DRAWINGS

CONVENTIONAL ART

DETAILED DESCRIPTION OF THE INVENTION

Reference will now be made in detail to the preferred embodiments of the present invention, a method and apparatus for deleting eligible bytes in a process of rate adaptation, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "compressing," "converting," "sending," "deleting," "writing," "inhibiting," "substituting," or the like, refer to the action and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

As such, embodiments of the present invention can be implemented on software running on a computer system. The computer system can be a personal computer, notebook computer, server computer, mainframe, networked computer, handheld computer, personal digital assistant, workstation, and the like. This software program is operable for providing document segmentation. In one embodiment, the computer system includes a processor coupled to a bus and memory storage coupled to the bus. The memory storage can be volatile or non-volatile and can include removable storage media. The computer can also include a display, provision for data input and output, etc.

Figure 2:
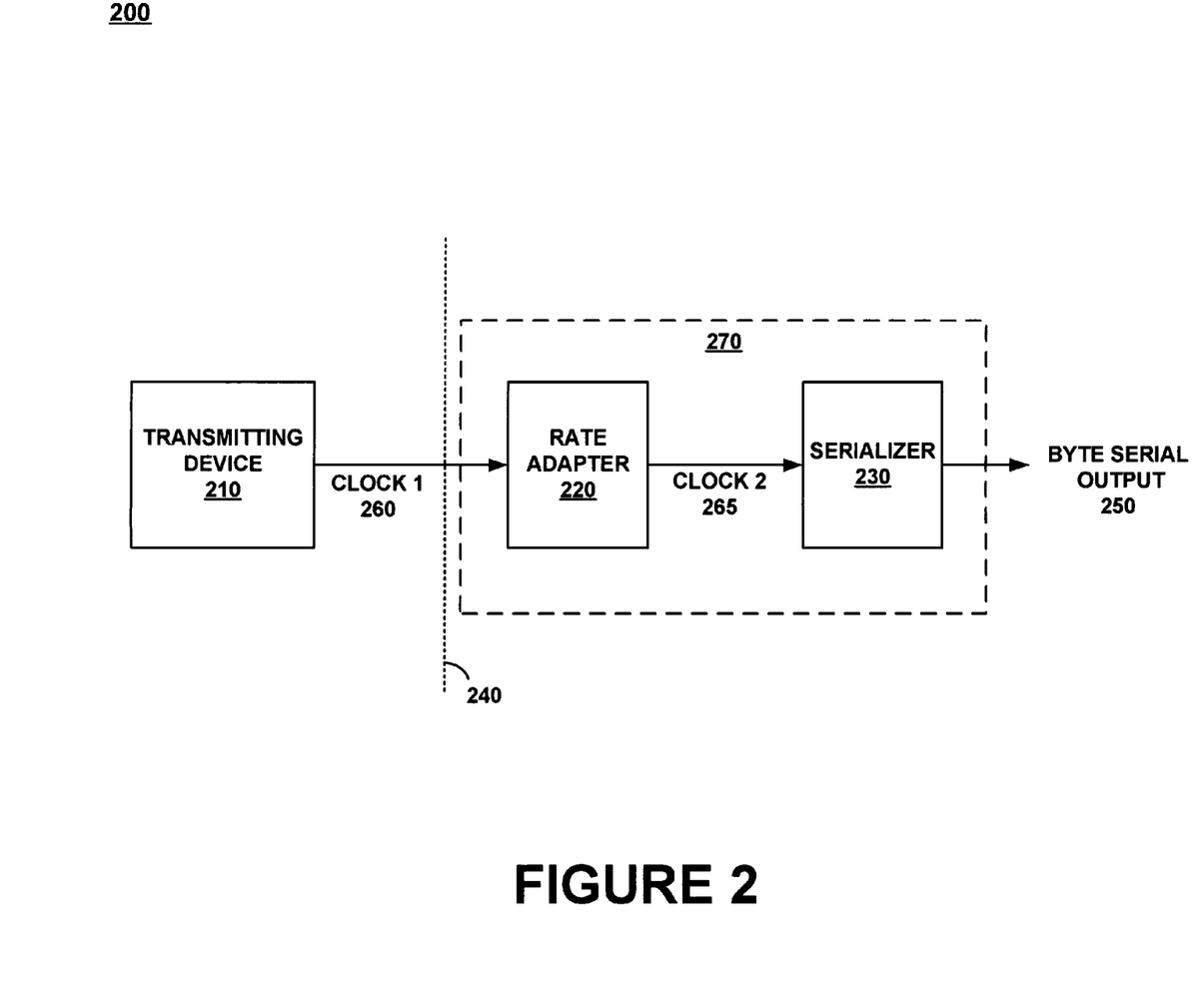
FIG. 2 is a block diagram of a network architecture that is capable of deleting eligible bytes for rate adaptation, in accordance with one embodiment of the present invention.

Referring now to FIG. 2, a network architecture 200 is illustrated disclosing a rate adapter 220 that is capable of deleting or inserting certain bytes, in accordance with one embodiment of the present invention. In the network architecture 200, a transmitting device 210 sends data to a client device 270. The transmitting device 210 sends data to the client device 270 at a first rate 260 (e.g., a first clock rate and/or a first data rate). Line 240 represents the demarcation of the transmitting device and the client device through the network architecture 200 and is representative of a various communication networks through which data can be transferred.

The client device operates at a second rate when reading the output data 250. Because the two rates are different between the incoming data to the client device 270 and the outputted data coming out of the client device 270, rate adaptation must be performed by the rate adapter 220. Data exiting the rate adapter 220 is outputted at a second rate 265 (e.g., a second clock rate and/or a second data rate).

The data exiting the rate adapter 220 is sent to the serializer 230 if it is multiple bytes wide. The serializer 230 can output data in a byte (8 bit) serial format that is preferred by the client device.

Figure 3:
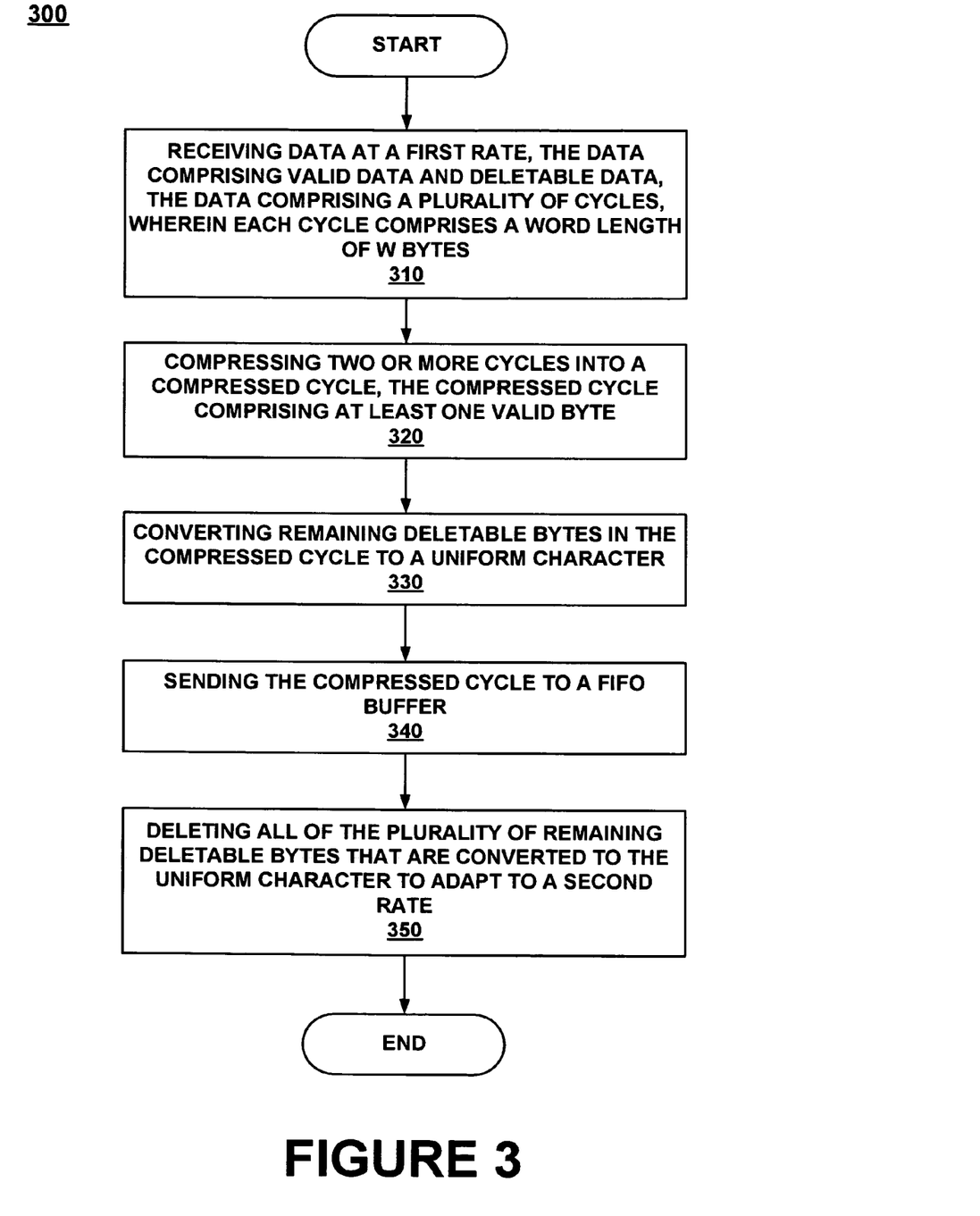
FIG. 3 is a flow diagram illustrating steps in a method for deleting eligible bytes for rate adaptation, in accordance with embodiments of the present invention.

Referring now to FIG. 3, a flow diagram illustrating steps in a method for performing byte rate adaptation is disclosed, in accordance with one embodiment of the present invention. The present embodiment begins by receiving data at a first rate in step 310. The first rate can be representative of a first clock rate or a first data rate, for example.

In one embodiment, the data received conforms to an 8B/10B line code format. The 8B/10B line code is representative of various transmission protocols, for example, Gigabit Ethernet, Enterprise Systems Connection (ESCON), SBCON, Fiber Channel, Fibre Connect (FICON), and Infiniband, etc. The 8B/10B line code ensures adequate bandwidth with increased quality of service performance by operating in a 10-bit code space.

The data comprises valid data and deletable data. The deletable data can conform to the 8B/10B encoding/decoding protocol that allows for special characters, which are not data, to be encoded in the data protocol for varying functions. Also, the deletable data may also conform to the special characters contained in the Transparent Generic Framing Procedure (TGFP) coded data. These special characters can include padding characters, idle sequences, primitive sequence, ordered sets, etc.

In addition, the data comprises a plurality of cycles. Each cycle is comprised of a word length or width of W bytes. Data can be received and transmitted in W byte blocks. Each byte contains 8 bits of data, in one embodiment. In addition, a plurality of blocks can be further grouped together for transmission. For example, the incoming data received in step 310 can be sent in a framing sequence.

In step 320, the present embodiment compresses two or more cycles into a compressed cycle. This is accomplished by deleting redundant deletable bytes, provided the FIFO buffer 340 is almost full. In other words, eligible bytes are deleted, where the eligible bytes are the redundant deletable bytes. The compressed cycle comprises at least one valid data byte for further transmission, as will be discussed more fully in the specification below. Otherwise, in another embodiment, when the compressed cycle contains W deletable bytes, the compressed cycle is itself deleted, and removed from further processing.

In step 330, the present embodiment illustrating the method of flow diagram 300 continues by converting remaining deletable bytes in the compressed cycle to a uniform character. In other words, the uniform character substitutes the remaining deletable bytes that are converted. From step 320, some deletable bytes may remain for further rate adaptation processing. As a result, these deletable bytes are included in the compressed cycle.

In one embodiment, the uniform character is a 65B_PAD padding character. The 65B_PAD character substantially complies with the TGFP specification. However, other embodiments are well suited to the use of other uniform characters. These uniform characters can be easily recognizable for later deletion in the rate adaptation process. In one embodiment, the remaining deletable bytes can also be flagged.

In step 340, the present embodiment continues by sending the compressed cycle to a FIFO buffer. The FIFO buffer outputs the data contained in the compressed cycle at a second clock rate. It is important to note that the first clock rate and the second clock rate, under some circumstances may be equal.

In step 350, the present embodiment continues by deleting all of the remaining deletable bytes that were converted to the uniform character. The present embodiment deletes remaining deletable bytes to conform with a second data rate. As such, varying numbers of deletable bytes that remain may be deleted to adapt the processed data to the second data rate. In addition, filler bytes can be also added according to the respective client protocol to the processed data in order to adapt to the second data rate. The filler bytes again can be the special character bytes, as previously disclosed.

As a result, the resulting data stream can be outputted at the second data rate. The processed data can be sent to a serializer to output the data stream in a serial format. For example, in one embodiment, the resultant data stream is outputted in an 8 bit byte serial format. Other embodiments are well suited to outputting the resultant data stream in serial formats other than 8 bits.

Figure 4:
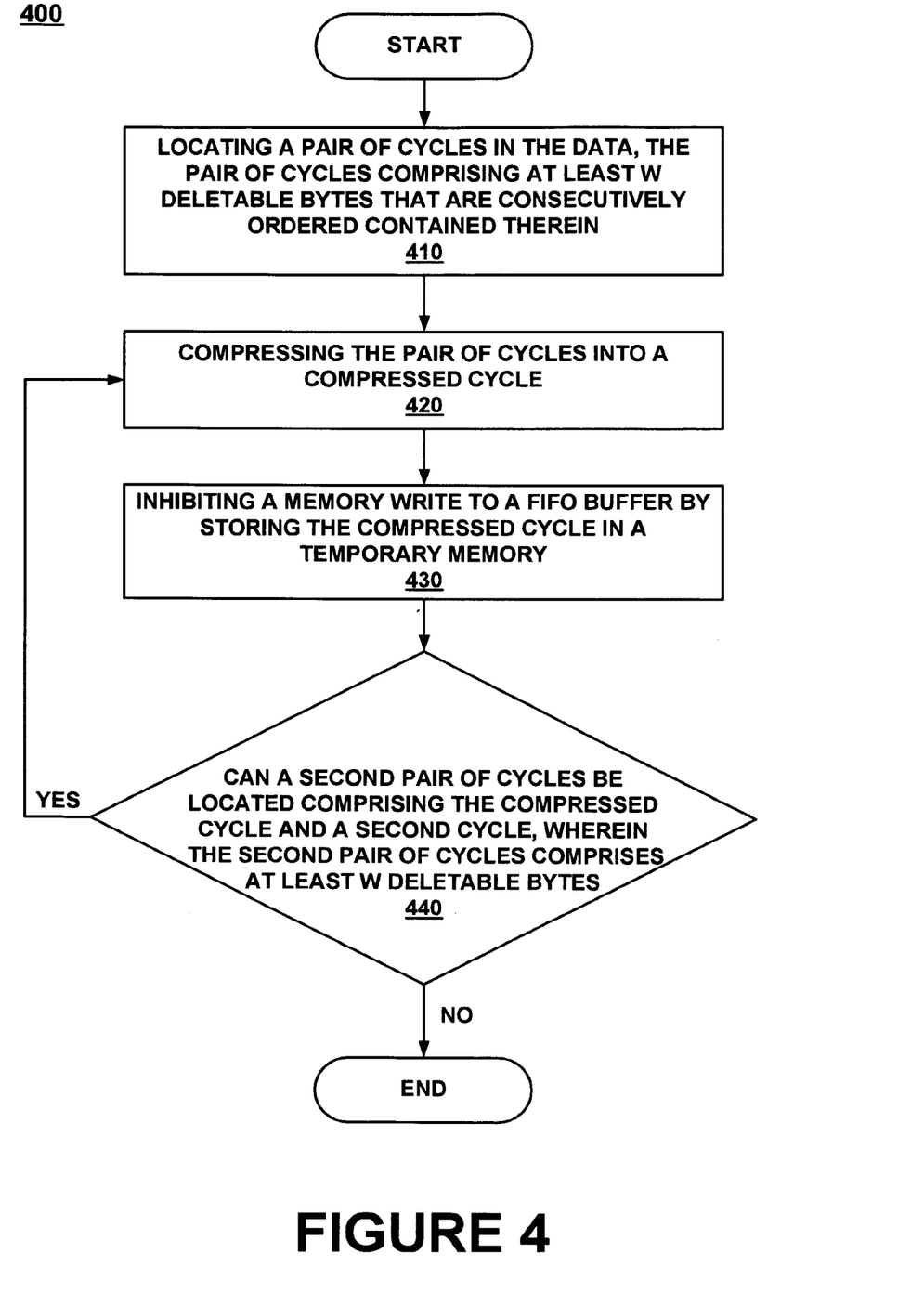
FIG. 4 is a flow diagram illustrating steps in a method for compressing two or more cycles of data into a compressed cycle, in accordance with embodiments of the present invention.

FIG. 4 is a flow diagram illustrating steps in a method for compressing two or more cycles of data into a compressed cycle, in accordance with one embodiment of the present invention. FIG. 4, in one implementation, is a more detailed representation of step 320 of the flow diagram 300 illustrated in FIG. 3.

The present embodiment begins by locating a pair of cycles in the data that is received by a client device, in step 410. The data was transmitted from a transmitting device at a first rate. Rate adaptation is performed to conform the data to a second rate that is compatible with the client device. The pair of cycles comprises at least W deletable bytes that are consecutively ordered and contained therein. As discussed previously, the deletable bytes are padding characters or special control characters substantially complying with the 8B/10B line code format.

In step 420, the present embodiment compresses the pair of cycles into a current compressed cycle. For the pair of cycles, the present embodiment locates a pair of redundant deletable bytes. The pair of cycles comprises at least W deletable bytes. For each pair of redundant deletable bytes, one of the pair is deleted, thereby resulting in the current compressed cycle.

In step 430, instead of forwarding the compressed cycle to the FIFO buffer, the present embodiment inhibits a memory write to the FIFO buffer by storing the current compressed cycle in a temporary memory. In this way, barrel shifters are no longer needed, thus reducing the gate counts for chips implementing the methods illustrated in FIGS. 3 and 4 for rate adaptation.

In one embodiment of the present invention, the pair of redundant bytes comprises a first redundant byte associated with a first cycle in the pair cycles, and a second redundant byte associated with a second cycle in the pair of cycles. In the present embodiment, the pair of redundant deletable bytes comprises a first deletable byte occupying a first position in a first sequence of W words of the first cycle. The pair of redundant deletable bytes also comprises a second deletable byte occupying the identical first position in a second sequence of W words of the second cycle.

In that case, in step 430, this embodiment overwrites the first redundant byte with the second redundant byte. The overwrite occurs in a memory register that comprises the first cycle. This process is performed for every pair of redundant bytes in the pair of cycles until the current compressed cycle is generated.

In decision step 440, the present embodiment illustrating flow diagram 400 determines if a second pair of cycles can be located, wherein the second pair of cycles comprises at least W deletable bytes. The second pair of cycles comprises the current compressed cycle and a second cycle that has not been processed.

From step 440, if a second pair of cycles cannot be located, then the present embodiment ends. In one implementation, from step 440, the present embodiment returns to step 330 of FIG. 3.

On the other hand, from step 440, if a second pair of cycles can be located, then the present embodiment returns to step 420 and performs a further compression with the second pair of cycles. In other words, the second pair of cycles is compressed into the current compressed cycle comprising at least one valid data byte.

This process is repeated by incrementing through the cycles that have not been processed until a second pair of cycles cannot be located. At that point, the present embodiment ends. In one implementation, from step 440, the present embodiment returns to step 330 of FIG. 3.

Figure 5:
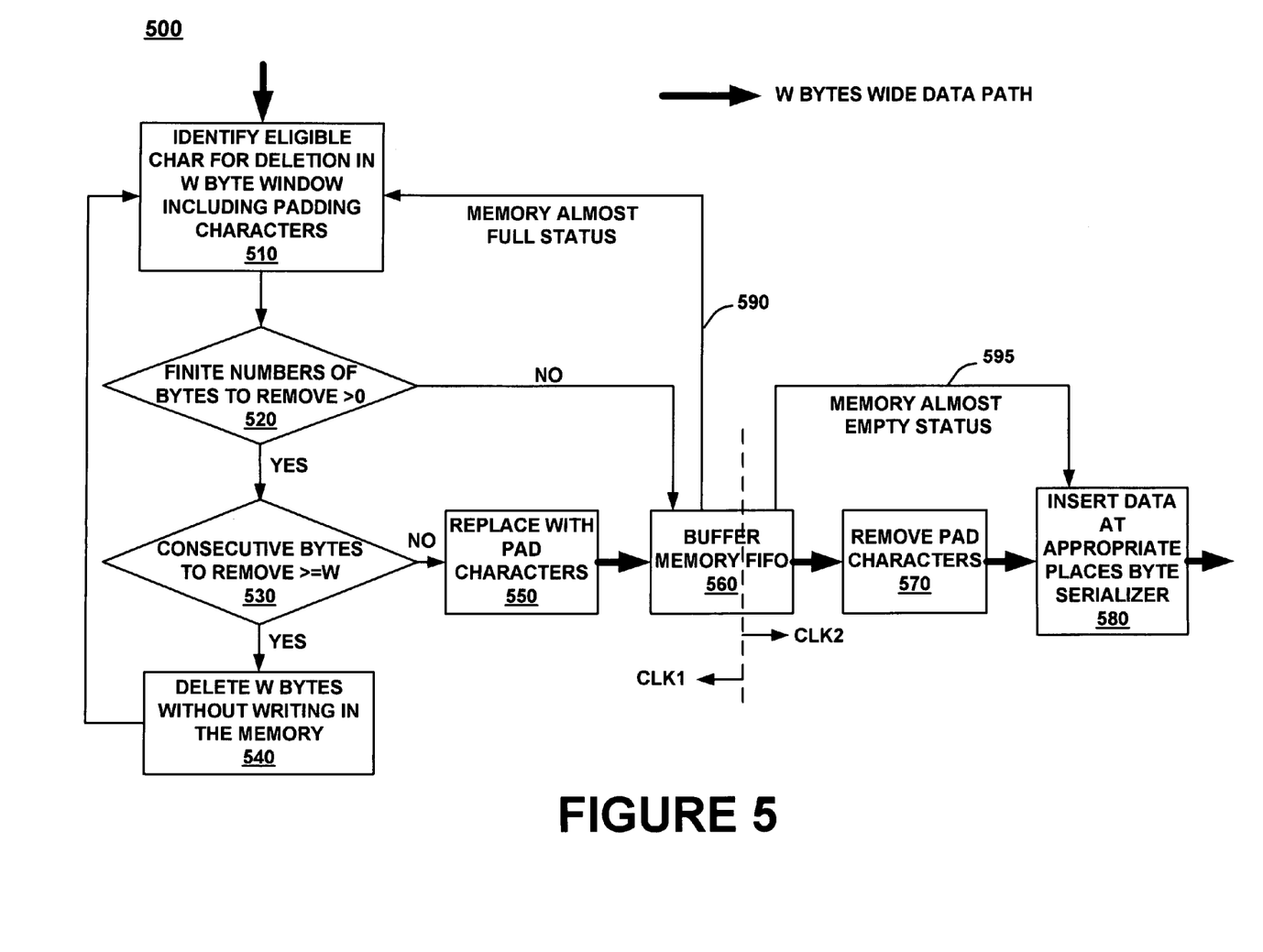
FIG. 5 is a flow diagram illustrating steps in a method for deleting eligible bytes for rate adaptation, in accordance with one embodiment of the present invention.
Figure 7:
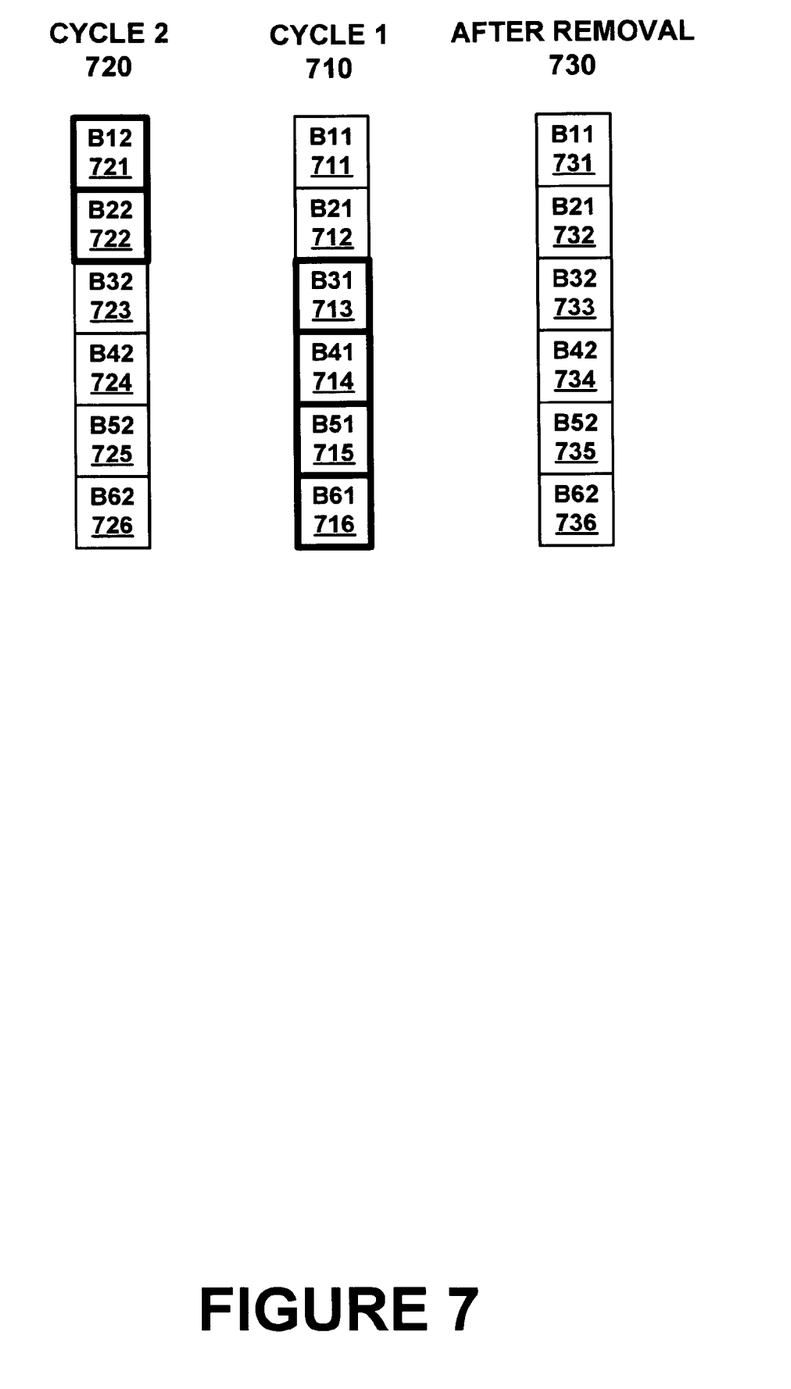
FIG. 7 is an example of deleting eligible bytes in a data stream for rate adaptation, in accordance with one embodiment of the present invention.
Figure 8:
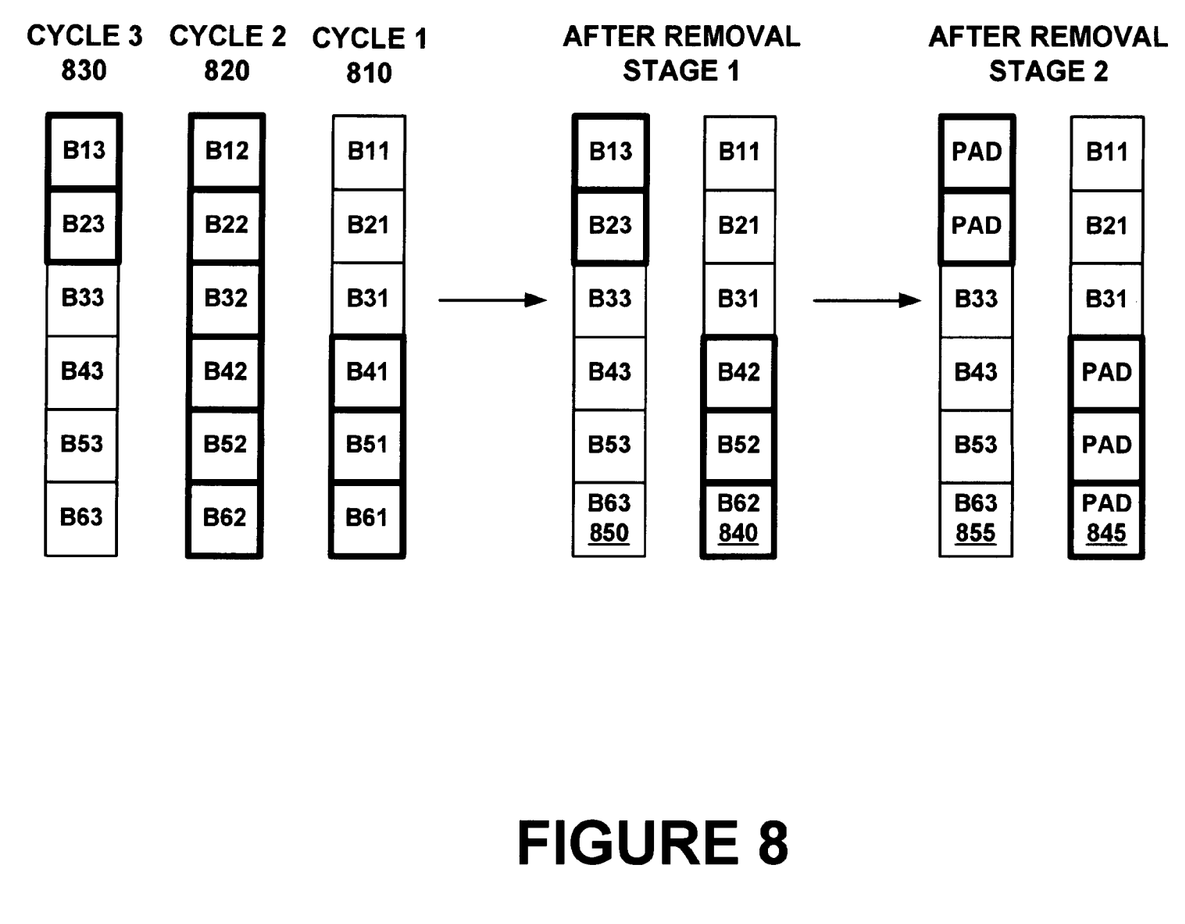
FIG. 8 is an example of deleting eligible bytes in a data stream for rate adaptation, in accordance with one embodiment of the present invention.

FIG. 5 illustrates a more detailed flow diagram 500 illustrating steps in a method for deleting bytes for rate adaptation, in accordance with one embodiment of the present invention. FIGS. 7 and 8 illustrate exemplary implementations of the method disclosed in FIGS. 3, 4 and 5.

In the approach illustrated in FIG. 5, a two tiered approach is taken for the character deletion process. This two tiered approach reduces the amount of logic necessary to perform rate adaptation, e.g., reduces the need for barrel shifters.

The present embodiment begins by receiving data. For example the data can be received by a client device that is performing rate adaptation. The data is received in a data path of W bytes in width. Also, the data is received at a first rate, e.g., a first clock rate and/or a first data rate.

The present embodiment identifies eligible byte characters deletion within a W byte window, as disclosed in step 510. These eligible characters include the padding characters and special control character sequences as permitted by the 8B/10B line code, as described previously in full.

In step 520, the present embodiment determines if there are a finite number of bytes that can be removed. If there are no bytes that can be removed, then the present embodiment proceeds to step 560 and inputs the W byte window to the FIFO buffer for transmission.

On the other hand, if there are bytes that can be removed, then the present embodiment, in step 520, proceeds to decision step 530 to determine if there are at least W consecutive deletable bytes in for a data path of W bytes wide. The first W deletable bites can at most span two cycles, where each cycle is W bytes.

If there are at least W deletable bytes in consecutive order, then the present embodiment deletes redundant deletable bytes without writing to the FIFO buffer, in step 540. As such, the two cycles of information are then collapsed into one cycle of information by inhibiting a memory write to the FIFO buffer. This is a simple operation, since only the position associated with the redundant deletable bytes to be deleted will be computed. The process described in step 540 has been fully disclosed previously in FIGS. 3 and 4.

Returning now from step 540, the present embodiment then returns back to step 510 to determine if there are at least another W consecutive bytes to be deleted. Again, if there are at least another W bytes to be deleted, the same operation disclosed in steps 510, 520, 530, and 540 are performed until the number of deletable bytes is less than W.

Turning now to FIG. 7, an exemplary diagram of the deletion of bytes in a two cycle window is disclosed, in accordance with embodiments of the present invention. The example provided in FIG. 7 is illustrative of the methods illustrated in FIGS. 3, 4, and 5. In particular, the example provided in FIG. 7 is illustrative of the step 540 of FIG. 5. The data path in FIG. 7 is 6 bytes wide. Although the present embodiment illustrates rate adaptation using a data path of 6 bytes, other data paths of varying widths can also be used. A noticeable improvement occurs the larger the width W for the data path that is used, as the number of barrel shifters are reduced.

The data in cycle 1 710 comprises 6 bytes, as follows: B11 711, B21 712, B31 713, B41 714, B51 715, and B61 716. Valid bytes in cycle 1 710 are as follows: B11 711 and B21 712. Deletable bytes in cycle 1 710 are as follows: B31 713, B41 714, B51 715, and B61 716. Also, the data in cycle 2 720 comprises 6 bytes, as follows: B12 721, B22 722, B32 723, B42 724, B52 725, and B62 726. Valid bytes in cycle 2 720 are, as follows: B32 723, B42 724, B52 725, and B62 726. Deletable bytes in cycle 2 are B12 721 and B22 722.

Looking at cycle 1 710 and cycle 2 720, there are at least W=6 consecutive deletable bytes between the two cycles, as follows: B31 713, B41 714, B51 715, B61 716, B12 721 and B22 722. As shown in FIG. 7, in step 540, the two cycles are combined into one cycle 730 by deleting all deletable bytes that are paired with valid data. In other words, an AND function can be performed wherein in a pair of bytes that occupy the same position in cycle 1 710 and cycle 2 720, the valid data will survive for further processing.

In the case of FIG. 7, in position 1, cycle 1 has B11 711 and cycle 2 720 has B12 720. In the compression sequence, the byte B11 711 from cycle 1 710 survives. In the example of FIG. 7, each of the positions in the two cycles are similarly structured with one valid data byte and a deletable data byte. As such, the valid data byte survives to form cycle 730 which comprises all the valid data bytes, as follows: B11 731, B21 732, B32 723, B42 724, B52 725, and B62 726.

Turning now to FIG. 8, an exemplary diagram of the deletion of bytes from more than two cycles is disclosed, in accordance with embodiments of the present invention. The example provided in FIG. 7 is illustrative of the methods illustrated in FIGS. 3, 4, and 5. In particular, the example provided in FIG. 7 is illustrative of the step 540 of FIG. 5. The data path in FIG. 7 is 6 bytes wide.

The data in cycle 1 810 comprises 6 bytes, as follows: B11, B21, B31, B41, B51, and B61. Valid bytes in cycle 1 810 are as follows: B11, B21, and B31. Deletable bytes in cycle 1 810 are as follows: B41, B51, and B61 716. Also, the data in cycle 2 820 comprises 6 bytes, as follows: B12, B22, B32, B42, B52, and B62. All of the bytes in cycle 2 820 are deletable. Also, the data in cycle 3 830 comprises 6 bytes, B13, B23, B33, B43, B53, and B63.

The cycle 840 and cycle 850 illustrate the remaining blocks after performing step 540 of FIG. 5, as well as the steps in FIGS. 3 and 4. After the first removal of deletable bytes occurs in stage 1, cycle 840 and cycle 850 remain. In the first stage of removal, the present embodiment examines cycle 1 810 and cycle 2 820 to remove deletable bytes. For positions 1, 2 and 3, the valid byte overcomes the deletable byte and is written into cycle 840. More specifically, in position 1, cycle 1 810 has B11 and cycle 2 820 has B12. The byte B11 overcomes B12 and is written to position 1 of cycle 840. In position 2, cycle 1 810 has B21 and cycle 2 820 has B22. The byte B21 overcomes B 22 and is written to position 2 of cycle 840. Similarly, in position 3, cycle 1 810 has B31 and cycle 2 820 has B32. The byte B31 overcomes B32 and is written to position 2 of cycle 840.

For positions 4, 5, and 6 of cycle 1 810 and cycle 2 820, there are redundant deletable bytes. In each pair of redundant deletable bytes, one is selected to be included into cycle 840. In one implementation, the redundant deletable byte in each pair from cycle 2 820 is selected to be written to cycle 840. For example, in the pair of deletable bytes (B41;B42) from position 4, B42 from cycle 820 is selected to be written in position 4 of cycle 840. In the pair of deletable bytes (B51;B52) from position 5, B52 from cycle 820 is selected to be written in position 5 of cycle 840. Similarly, in the pair of deletable bytes (B61;B62) from position 6, B62 from cycle 820 is selected to be written in position 6 of cycle 840.

As such, the compressed cycle is comprised of valid bytes B11, B21, and B31, and of deletable bytes B42, B52, and B62. From this point, the next cycle, cycle 3 830 is examined to determine again if there are more than 6 deletable bytes that are ordered consecutively, in stage 2. Because there only 5 deletable bytes that are in consecutive order, there can be no further processing of the cycles. In this case, after removal of deletable bytes in stage 2, the cycle 840 remains intact as cycle 845. In addition, the cycle 850 remains intact as cycle 855.

By way of illustration, the cycle 855 is positioned correctly for the present embodiment to perform step 510 of FIG. 5. Also, cycle 845 is positioned correctly to perform step 550 of FIG. 5, as follows. Returning back to FIG. 5, when the number of deletable bytes is less than W, the present embodiment replaces the selected deletable bytes with a uniform character that is a single byte character, in step 550. The selected deletable bytes are the remaining deletable bytes left to be processed in the compressed cycle, as previously mentioned. In one implementation, the single byte pad character is the 65B_PAD character conforming to the TGFP specification. Other embodiments are well suited to using other single byte characters that are uniform and uniquely identifiable.

From block 550, the present embodiment sends the processed data, or compressed cycle, to a FIFO buffer, in step 560. A gating mechanism is employed in which data into the FIFO buffer is only accepted by the FIFO buffer when there is sufficient amounts of memory in the FIFO buffer, as is illustrated by line 590. If there is insufficient amounts of memory in the FIFO buffer, then the conventional method returns the data to step 510.

The data entering the FIFO buffer is clocked at the first rate (e.g., first clock rate and/or first data rate). The data exiting the FIFO buffer is clocked at the second rate (e.g., the second clock rate and/or second data rate), that is preferred by the client device. In the present embodiment, the FIFO buffer will output data directly to the serializer when the capacity of the FIFO buffer allows. In one implementation, when the FIFO buffer is almost empty, the present embodiment directly inserts data to the serializer for transmission at the second data rate.

On the other hand, if further rate adaptation is necessary, the present embodiment removes the uniquely identified uniform characters, in step 570. In one embodiment, when reading from the FIFO memory, all of the uniform characters are deleted before transmitting the processed data. It is noted that there will be at least one valid byte which can be transmitted out.

Deletion of uniform characters may be accomplished by marking these deletable characters as invalid, and skipping them when data is finally sent out serially. Thus, this step does byte deletion when there are less than W deletable bytes that can be deleted. In other embodiments, only selected uniform characters are deleted to conform the outputted data stream with a particular format.

From step 570, the present embodiment sends the processed data to a serializer. The serializer inserts the processed data at the appropriate places in order to conform the outputted data stream to a particular format (e.g., an 8 bit byte serial interface). Filler bytes are inserted as is known to those well versed in the art to conform the outputted data stream to the particular format.

Figure 6:
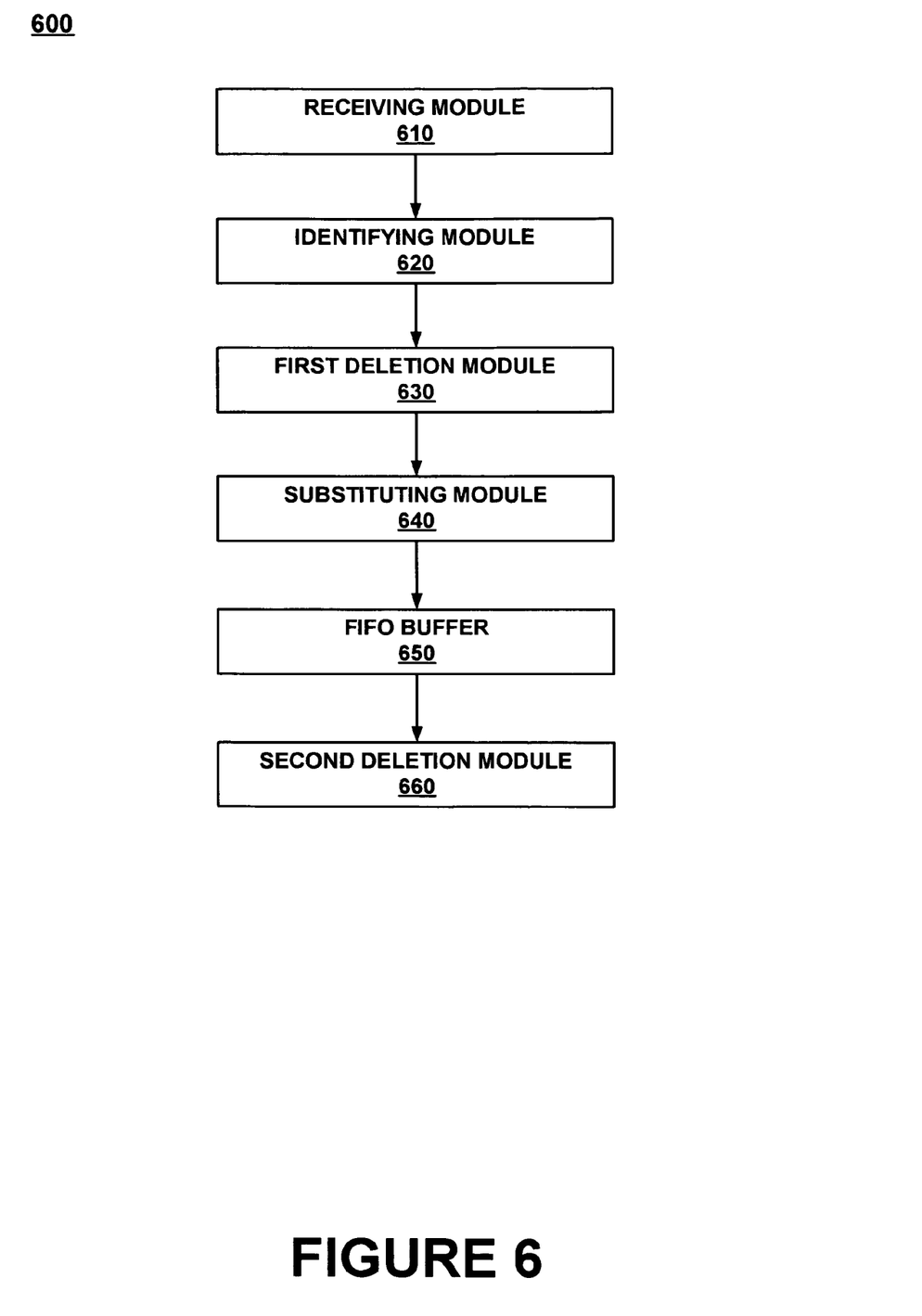
FIG. 6 is a block diagram illustrating a rate adapter capable of deleting eligible bytes for rate adaptation, in accordance with one embodiment of the present invention.

FIG. 6 is a block diagram illustrating a rate adapter 600 that is capable of deleting deletable bytes, in accordance with one embodiment of the present invention. The rate adapter 600 is capable of implementing the methods of FIGS. 3, 4, and 5 to perform the deletion of deletable bytes for rate adaptation, in accordance with embodiments of the present invention.

The rate adapter module 600 comprises a receiving module 610, an identifying module 620, a first deletion module 630, a substituting module 640, a FIFO buffer 650, and a second deletion module 660. The receiving module 610 is coupled to the identifying module 620. The identifying module 620 is coupled to the first deletion module 630. The first deletion module 630 is coupled to the substituting module 640. The substituting module 640 is coupled to the FIFO buffer 650. And the FIFO buffer 650 is coupled to the second deletion module 660.

In particular, the receiving module 610 is configured for receiving data at a first rate. The data comprises valid data and deletable data. The data comprises a plurality of cycles, wherein each cycle comprises a word length of W bytes. The function performed by the receiving module 610 is illustrated by and more fully discussed in step 310 of FIG. 3.

The identifying module 620 is configured for locating a pair of cycles in the data. The pair of cycles comprises at least W deletable bytes that are consecutively ordered contained therein. The function performed by the identifying module 620 is illustrated by and more fully discussed in step 410 of FIG. 4.

The first deletion module 630 is configured for compressing the pair of cycles into a compressed cycle. The compressed cycle comprises at least one valid data byte. The function performed by the first deletion module 630 is illustrated by and more fully discussed in step 420 of FIG. 4.

The substituting module 640 is configured for converting remaining deletable bytes in the compressed cycle to a uniform character. The function performed by the substituting module 640 is illustrated by and more fully discussed in step 330 of FIG. 3.

The buffer memory 650 is configured for receiving the compressed cycle for further transmission at a second rate. The function performed by the FIFO buffer 650 is illustrated by and more fully discussed in step 340 of FIG. 3.

The second deletion module 660 of the rate adapter 600 is configured to delete all the remaining deletable bytes that were converted to the uniform character, in step 640. The function performed by the second deletion module 660 is illustrated by and more fully discussed in step 350 of FIG. 3.

While the methods of embodiments illustrated in flow charts 300, 400, and 500 show specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

Embodiments of the present invention, performing byte rate adaptation, is thus described. While the present invention has been described in particular embodiments, it should be appreciated that the present invention should not be construed as limited by such embodiments, but rather construed according to the below claims.

What is claimed is:

1. A method for performing byte rate adaptation comprising:
   a) receiving data at a first rate, said data comprising valid data and deletable data, said data comprising a plurality of cycles, wherein each cycle comprises a word length of W bytes;
   b) compressing two or more cycles into a compressed cycle by deleting eligible deletable bytes, said compressed cycle comprising at least one valid data byte;
   c) converting remaining deletable bytes in said compressed cycle to a uniform character; and
   d) sending said compressed cycle of c) including said uniform character to a FIFO buffer.

2. The method as described in claim 1, further comprising:
   e) deleting all of said remaining deletable bytes that were converted to said uniform character in said c) to conform with a second rate; and
   f) outputting a data stream including said at least one valid data byte at said second rate.

3. The method as described in claim 2, wherein said uniform character is a 658B_PAD character substantially complying with the Transparent Generic Framing Procedure specification and its related derivatives.

4. The method as described in claim 1, wherein b) comprises:
   b1) deleting a conflicting deletable byte for each pair of bytes in a plurality of pairs of cycles to obtain said compressed cycle, wherein said each pair of bytes comprises a valid byte and a deletable byte occupying the same byte position in a respective pair of cycles, wherein said eligible deletable byte is said conflicting deletable byte, and wherein each of said plurality of pairs of cycles comprises at least said W deletable bytes that are consecutively ordered contained therein.

5. The method as described in claim 1, wherein b) comprises:
   b1) deleting one redundant deletable byte for each pair of redundant deletable bytes in a plurality of pairs of cycles to obtain said compressed cycle, wherein said eligible deletable byte is said one redundant deletable byte, and wherein each of said plurality of pairs of cycles comprises at least said W deletable bytes that are consecutively ordered contained therein.

6. The method as described in claim 5, wherein each of said pair of redundant deletable bytes comprises a first redundant deletable byte associated with a first cycle in a pair of cycles and a second redundant deletable byte associated with a second cycle in said pair of cycles, and wherein b1) further comprises:
   overwriting said first redundant deletable byte with said second redundant deletable byte in a memory register comprising said first cycle to inhibit a memory write to said FIFO buffer.

7. The method as described in claim 1, wherein b) further comprises:
   b1) compressing a first pair of cycles into a first compressed cycle comprising at least one valid data byte;
   b2) inhibiting a memory write to said FIFO buffer by storing said first compressed cycle in a temporary memory; and
   b3) compressing a second pair of cycles into said compressed cycle comprising at least one valid data byte, said second pair of cycles comprising said first compressed cycle and a second cycle, said second pair of cycles comprising at least said W deletable bytes that are consecutively ordered contained therein.

8. The method as described in claim 1, wherein b) further comprises:
   b1) removing said compressed cycle from further processing when said compressed cycle comprises W deletable bytes.

9. A method for performing byte rate adaptation comprising:
   a) receiving data at a first rate, said data comprising valid data and deletable data, said data comprising a plurality of cycles, wherein each cycle comprises a word length of W bytes;
   b) locating a pair of cycles in said data comprising at least W deletable bytes that are consecutively ordered contained therein;
   c) compressing said pair of cycles into a compressed cycle, said compressed cycle comprising at least one valid data byte;
   d) converting remaining deletable bytes in said compressed cycle to a uniform character; and
   e) sending said compressed cycle of d) including said uniform character to a FIFO memory for further transmission at a second rate.

10. The method as described in claim 9, further comprising:
    f) removing all of said remaining deletable bytes that were converted to said uniform character in said d) to adapt to a second rate; and
    g) outputting said valid data bytes in a data stream at said second rate.

11. The method as described in claim 9, wherein said data conforms with an 8B/10B line code.

12. The method as described in claim 9, wherein said uniform character is a 65B_PAD character substantially complying with the Transparent Generic Framing Procedure specification and its related derivatives.

13. The method as described in claim 9, wherein c) comprises:
    c1) deleting one redundant deletable byte for each pair of redundant deletable bytes in said pair of cycles to obtain said compressed cycle, said pair of redundant deletable bytes comprising a first deletable byte occupying a first position in a first sequence of W bytes of a first cycle in said pair of cycles, and a second deletable byte occupying said first position in a second sequence of N bytes of a second cycle in said pair of cycles.

14. The method as described in claim 9, wherein c) comprises:
   c1) deleting a conflicting deletable byte for each pair of conflicting bytes in said pairs of cycles to obtain said compressed cycle, said pair of conflicting bytes comprising a valid byte occupying a first position in a first sequence of W bytes of a first cycle in said pair of cycles, and said conflicting deletable byte occupying said first position in a second sequence of W bytes of a second cycle in said pair of cycles.

15. The method as described in claim 9, wherein c) further comprises:
   c1) deleting one redundant deletable byte for each pair of redundant bytes in said pair of cycles to obtain a first compressed cycle;
   c2) storing said first compressed cycle in a temporary buffer;
   c3) compressing a second pair of cycles into said compressed cycle, said second pair of cycles comprising said first compressed cycle and a third cycle, said second pair of cycles comprising more than said N deletable bytes that are consecutively ordered contained therein.

16. The method as described in claim 9, wherein said first rate is a first data rate and said second rate is a second data rate.

17. A rate adapter for performing byte rate adaptation comprising:
   a receiving module for receiving data at a first rate, said data comprising valid data and deletable data, said data comprising a plurality of cycles, wherein each cycle comprises a word length of N bytes;
   an identifying module for locating a pair of cycles in said data comprising at least N deletable bytes that are consecutively ordered contained therein;
   a deletion module for compressing said pair of cycles into a compressed cycle, said compressed cycle comprising at least one valid data byte;
   a substituting module for converting remaining deletable bytes in said compressed cycle to a uniform character; and
   a buffer memory for receiving said compressed cycle including said uniform character for further transmission at a second rate.

18. The rate adapter of claim 17, further comprising:
   a second deletion module for removing all of said remaining deletable bytes that were converted to said uniform character by said substituting module; and an output generator for outputting said valid data bytes in a data stream at said second rate.

19. The rate adapter of claim 17, wherein said data conforms with an 8B/10B line code.

20. A computer system comprising:
   a bus;
   a memory unit coupled to said bus; and
   a processor coupled to said bus, said processor for executing a method for performing byte rate adaptation comprising:
   a) receiving data at a first rate, said data comprising valid data and deletable data, said data comprising a plurality of cycles, wherein each cycle comprises a word length of N bytes; b) compressing two or more cycles into a compressed cycle by deleting redundant deletable bytes, said compressed cycle comprising at least one valid data byte;
   c) converting remaining deletable bytes in said first compressed cycle to a uniform character; and
   d) sending said first compressed cycle of c) including said uniform character to a FIFO buffer.

21. The computer system of claim 20, wherein said method further comprises:
   e) removing all of said remaining deletable bytes that are converted to said uniform character in said c) to adapt to a second rate; and
   f) outputting a data stream including said at least one valid data byte at said second rate.

22. The computer system of claim 21, wherein said uniform character is a 65B_PAD character substantially complying with the Transparent Generic Framing Procedure specification and its related derivatives.

23. The computer system of claim 20, wherein b) comprises:
   b1) deleting a conflicting deletable byte for each pair of bytes in a plurality of pairs of cycles to obtain said compressed cycle, wherein said each pair of bytes comprises a valid byte and a deletable byte occupying the same byte position in a respective pair of cycles, wherein said eligible deletable byte is said conflicting deletable byte, and wherein each of said plurality of pairs of cycles comprises at least said N deletable bytes that are consecutively ordered contained therein.

24. The computer system of claim 20, wherein b) in said method comprises:
   b1) removing one redundant deletable byte for each pair of redundant deletable bytes in a plurality of pairs of cycles to obtain said compressed cycle, each of said plurality of pairs of cycles comprising at least said N deletable bytes that are consecutively ordered contained therein.

25. The computer system of claim 24, wherein each of said pair of redundant bytes comprises a first redundant byte associated with a first cycle in said pair of cycles and a second redundant byte associated with a second cycle in said pair of cycles, and wherein b1) in said method further comprises:
   overwriting said first redundant byte with said second redundant byte in a memory register comprising said first cycle to inhibit a memory write to said FIFO buffer.

26. The computer system of claim 20, wherein b) in said method further comprises:
   b1) compressing a first pair of cycles into a first compressed cycle comprising at least one valid data byte;
   b2) inhibiting a memory write to said FIFO buffer by storing said first compressed cycle in a temporary memory; and
   b3) compressing a second pair of cycles into said compressed cycle comprising at least one valid data byte, said second pair of cycles comprising said first compressed cycle and a second cycle, said second pair of cycles comprising at least said W deletable bytes that are consecutively ordered contained therein.

27. The computer system of claim 20, wherein b) in said method further comprises:
   b1) removing said compressed cycle from further transmission when said compressed cycle comprises W deletable bytes.

* * * * *